(12) United States Patent
Kim

(10) Patent No.: US 10,905,308 B2
(45) Date of Patent: Feb. 2, 2021

(54) DISH WASHER

(71) Applicant: PRIME.CO., LTD., Incheon (KR)

(72) Inventor: Sung Hyun Kim, Incheon (KR)

(73) Assignee: PRIME CO., LTD., Incheon (KR)

( * ) Notice: Subject to any disclaimer, the term of this patent is extended or adjusted under 35 U.S.C. 154(b) by 30 days.

(21) Appl. No.: 15/318,945

(22) PCT Filed: Nov. 16, 2016

(86) PCT No.: PCT/KR2016/013172
§ 371 (c)(1),
(2) Date: Jan. 26, 2018

(87) PCT Pub. No.: WO2018/092925
PCT Pub. Date: May 24, 2018

(65) Prior Publication Data
US 2019/0008356 A1 Jan. 10, 2019

(30) Foreign Application Priority Data

Nov. 15, 2016 (KR) .................. 10-2016-0152032

(51) Int. Cl.
*A47L 15/42* (2006.01)
*A47L 15/24* (2006.01)
(Continued)

(52) U.S. Cl.
CPC ....... *A47L 15/4206* (2013.01); *A47L 15/0007* (2013.01); *A47L 15/0076* (2013.01); *A47L 15/245* (2013.01); *A47L 15/4202* (2013.01); *A47L 15/4219* (2013.01); *A47L 15/4278* (2013.01); *A47L 15/4285* (2013.01);
(Continued)

(58) Field of Classification Search
CPC ...... B01D 29/33; B01D 35/027; B01D 29/15; B01D 29/66; B01D 35/30; B01D 29/86; A47L 15/4285; A47L 15/0007; A47L 15/48; A47L 15/0076; A47L 15/4291; A47L 15/4206; A47L 15/4219; A47L 15/4202; A47L 15/245; A47L 15/4278;
(Continued)

(56) References Cited

U.S. PATENT DOCUMENTS 2,564,798 A * 8/1951 Allensworth ......... A47L 15/241
134/60
2010/0139690 A1* 6/2010 Gaus .................. A47L 15/0013
134/1
(Continued)

*Primary Examiner* — Benjamin L Osterhout

(57) ABSTRACT

Disclosed a dishwasher, wherein dishes placed on a conveyor are washed, rinsed, and dried while being sequentially conveyed to a washing chamber, a rinsing chamber, and a drying chamber, the dishwasher including: a heat exchanger allowing hot air to be supplied to the drying chamber by heat exchange; a wash water tank in which water supplied to the washing chamber or the rinsing chamber is stored; and a spray device spraying water supplied from the wash water tank onto the dishes placed on the conveyor, whereby it is possible to save energy by providing a single heat exchanger to preheat wash water and rinse water and supply hot air to the drying chamber, and to improve circulation of wash water by a filtering device applied to a structure for reusing wash water, thereby improving sanitation of dishwashing.

10 Claims, 10 Drawing Sheets

(51) Int. Cl.
    *A47L 15/00*     (2006.01)
    *B01D 29/66*     (2006.01)
    *B01D 29/86*     (2006.01)
    *A47L 15/48*     (2006.01)
    *B01D 29/15*     (2006.01)
    *B01D 35/30*     (2006.01)
    *B01D 35/027*    (2006.01)
    *B01D 29/33*     (2006.01)

(52) U.S. Cl.
    CPC .............. *A47L 15/48* (2013.01); *B01D 29/15* (2013.01); *B01D 29/33* (2013.01); *B01D 29/66* (2013.01); *B01D 29/86* (2013.01); *B01D 35/027* (2013.01); *B01D 35/30* (2013.01); *A47L 2501/06* (2013.01); *A47L 2501/11* (2013.01); *Y02B 40/00* (2013.01)

(58) Field of Classification Search
    CPC .............. A47L 15/247; A47L 2501/06; A47L 2501/11; Y02B 40/44; Y02B 40/00
    See application file for complete search history.

(56) References Cited

U.S. PATENT DOCUMENTS

| | | | |
|---|---|---|---|
| 2017/0027404 A1* | 2/2017 | Anim-Mensah | A47L 15/0015 |
| 2017/0027407 A1* | 2/2017 | Mills | F25B 39/00 |
| 2017/0027408 A1* | 2/2017 | Paulus | A47L 15/4285 |
| 2017/0027409 A1* | 2/2017 | Anim-Mensah | A47L 15/4285 |
| 2017/0112351 A1* | 4/2017 | Sanders | A47L 15/241 |
| 2017/0172371 A1* | 6/2017 | Engesser | A47L 15/241 |

* cited by examiner

[Fig. 1]
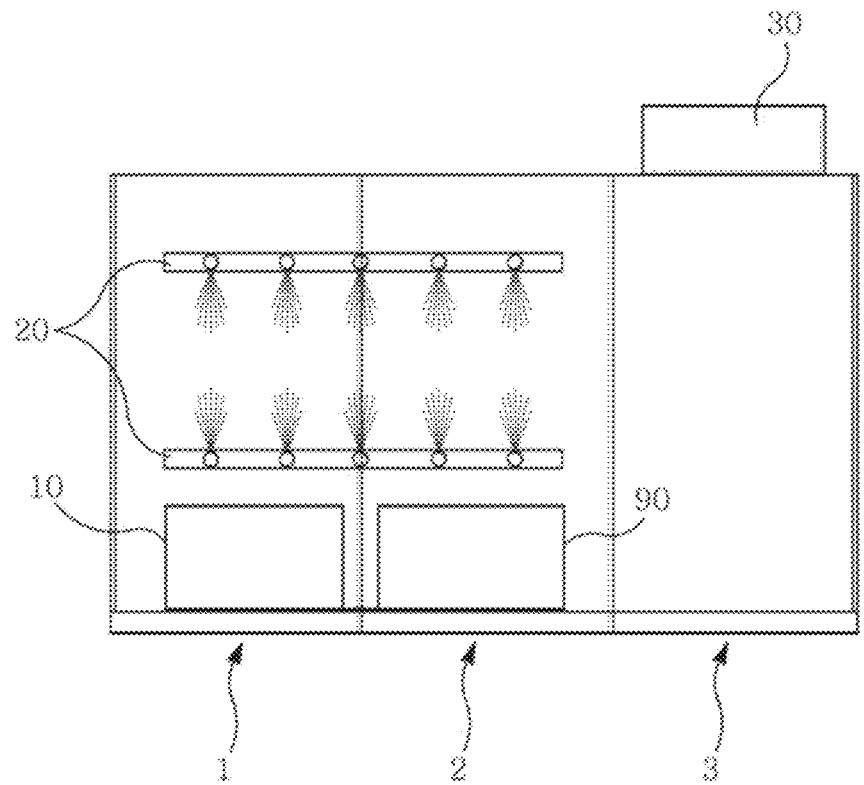
[Fig. 2]
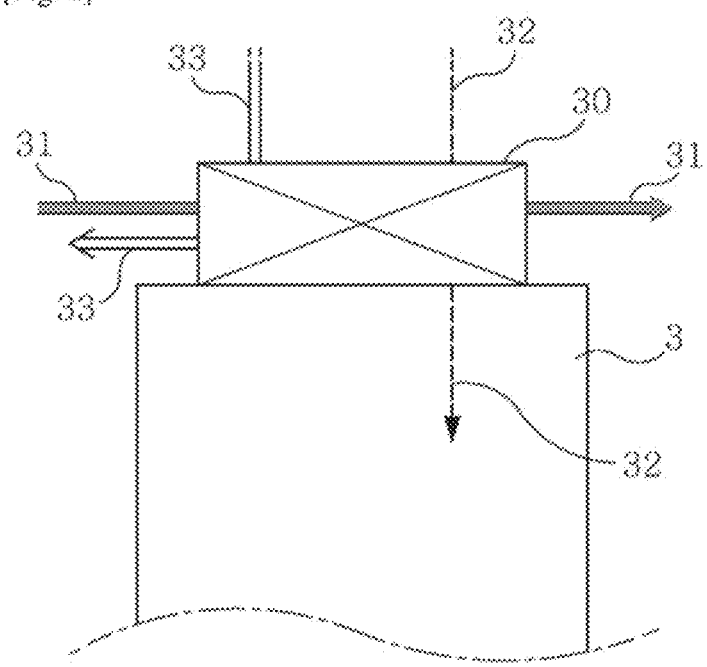

[Fig. 3]
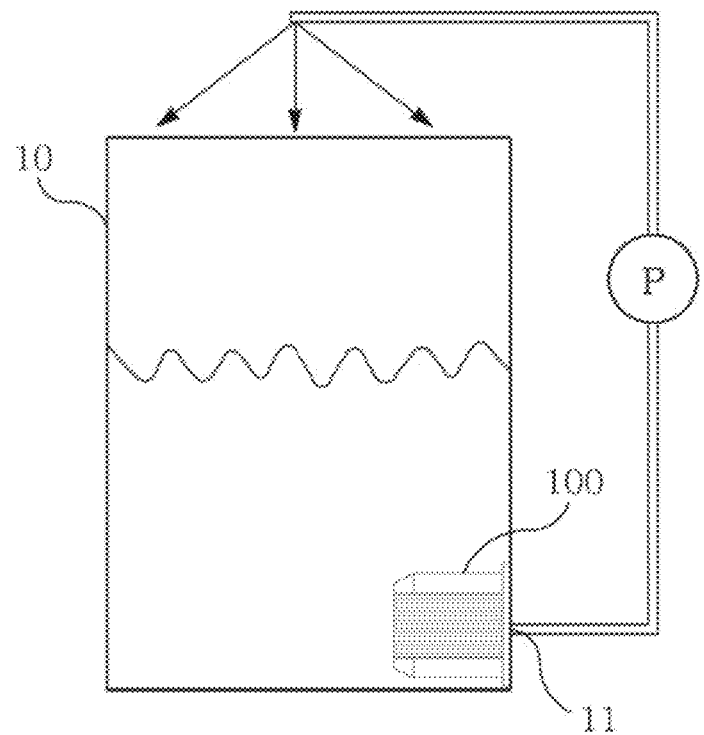
[Fig. 4]
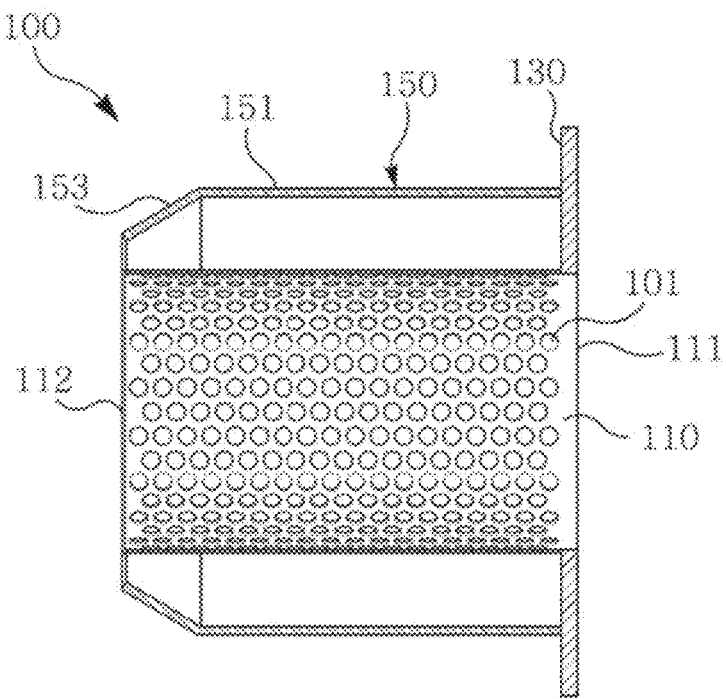

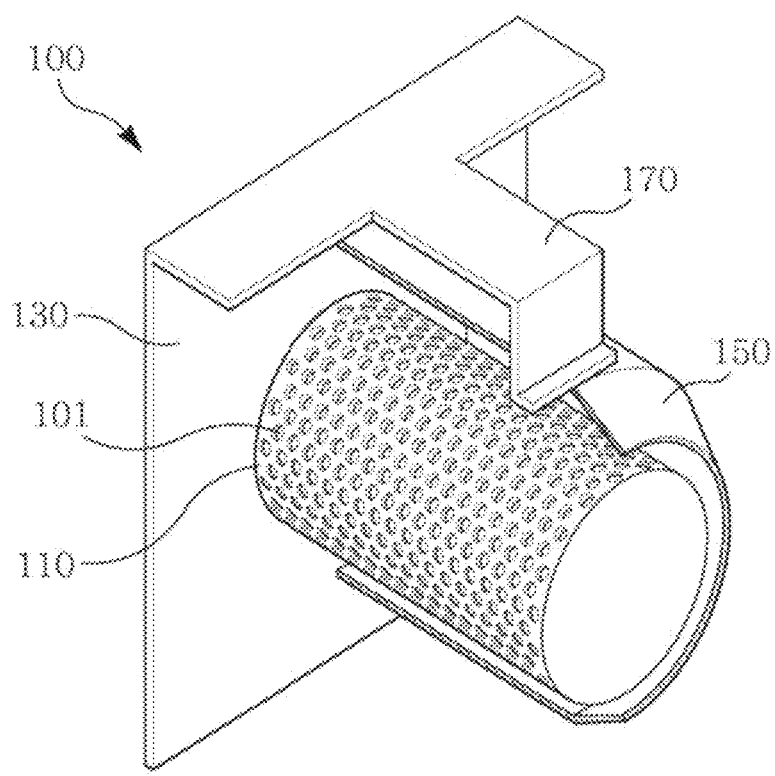
[Fig. 5]

[Fig. 6a]
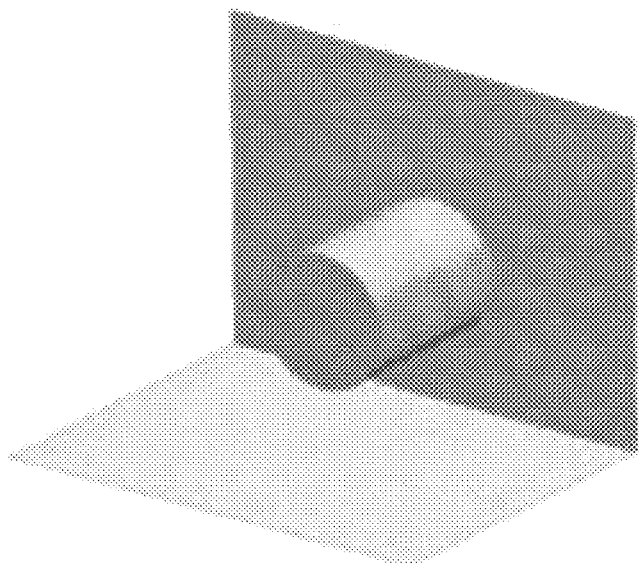
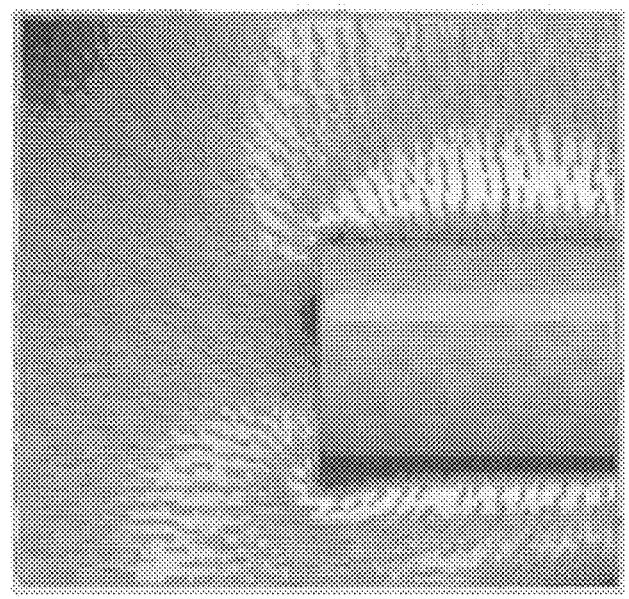

[Fig. 6b]
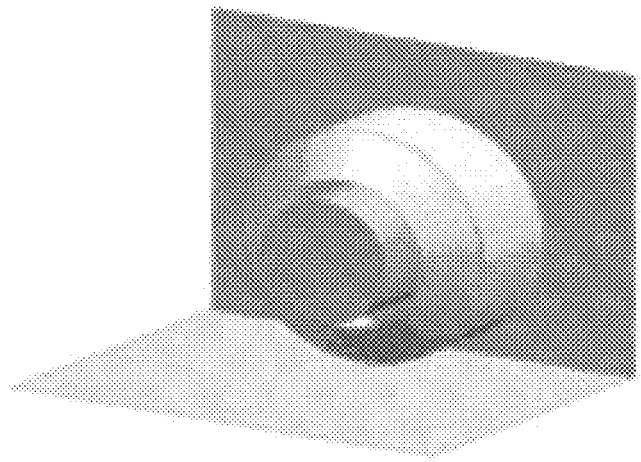
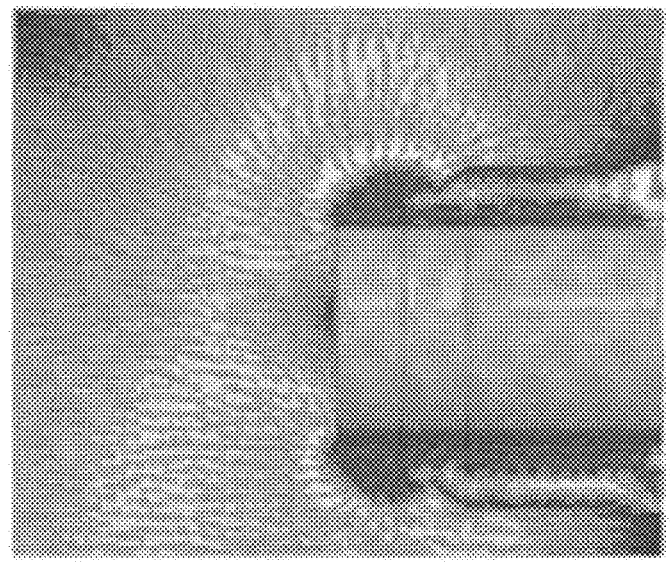

[Fig. 7a]
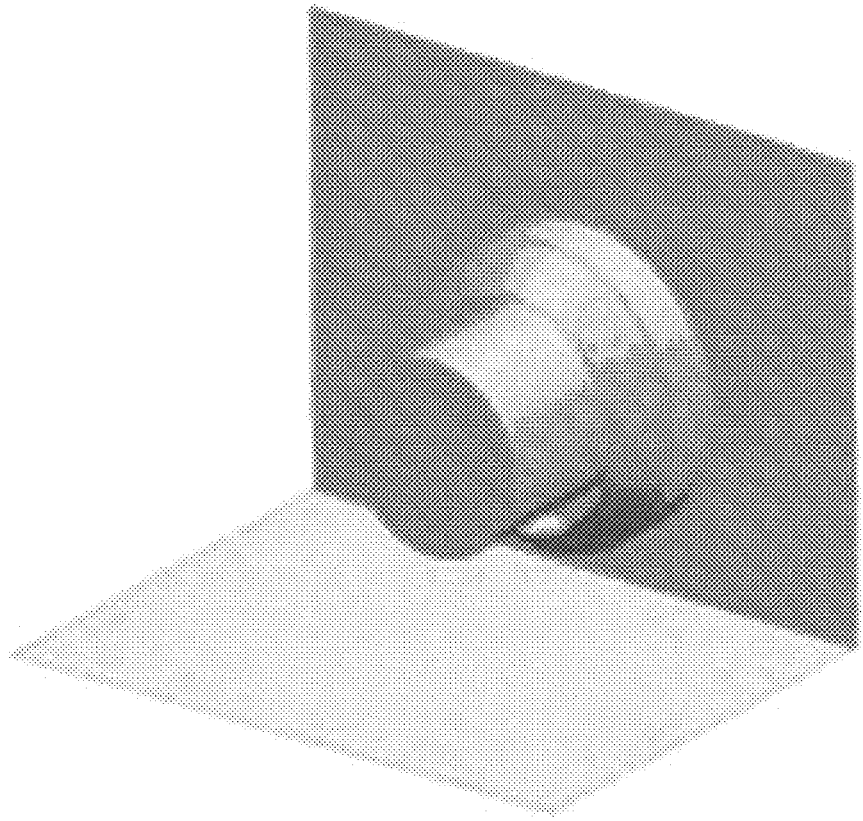
[Fig. 7b]
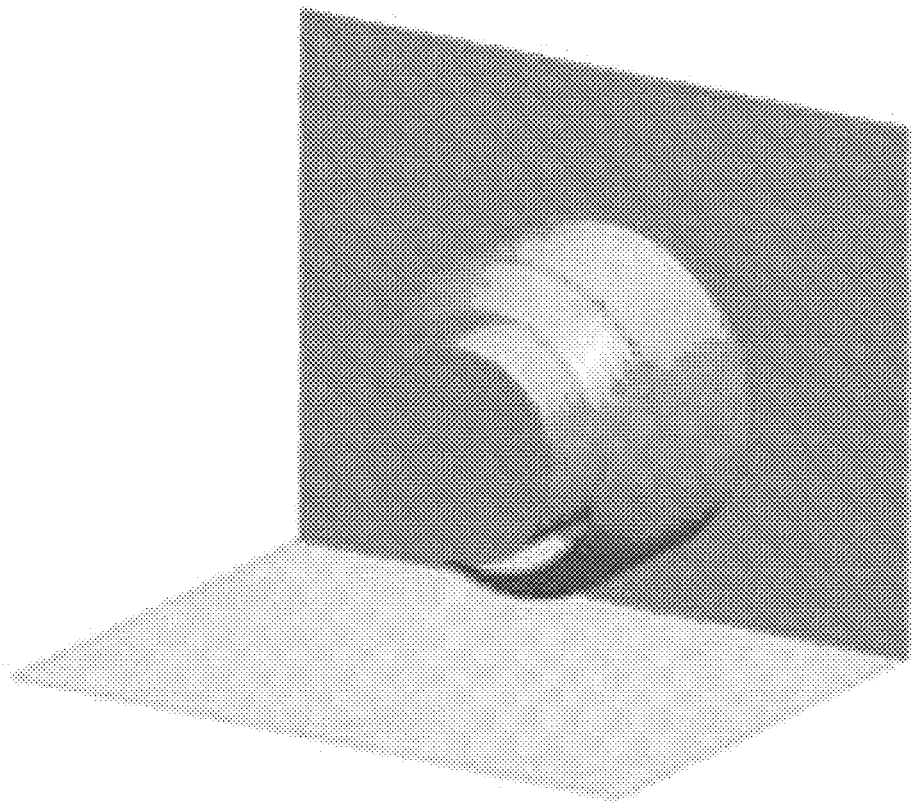

[Fig. 7c]
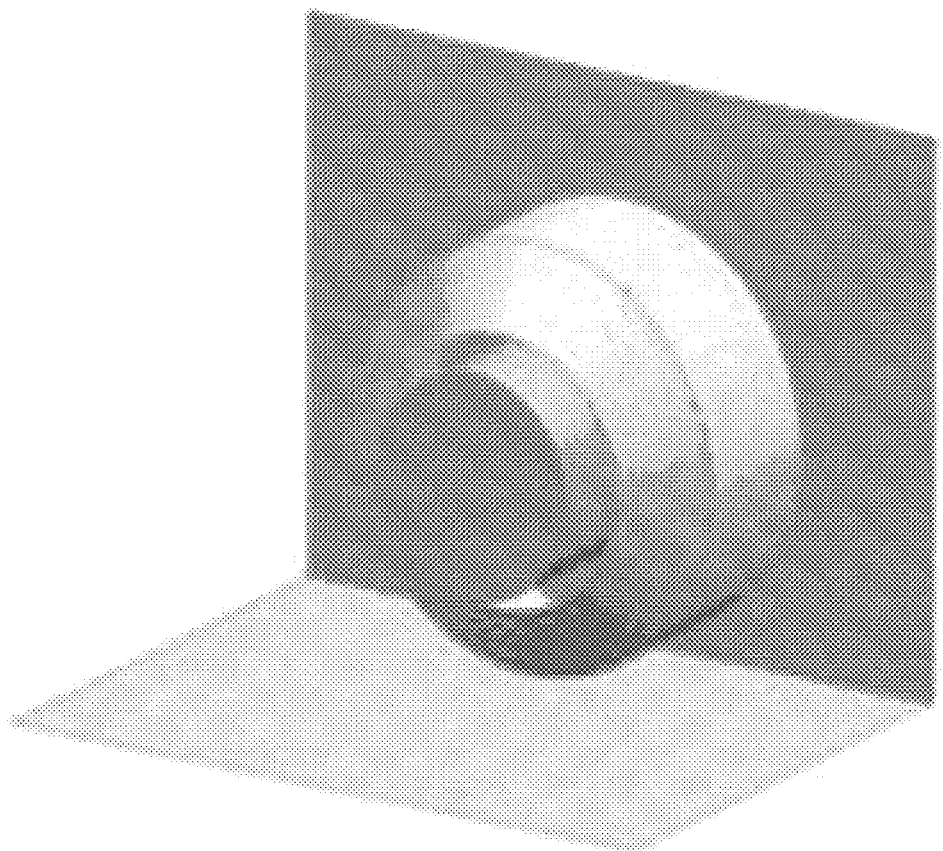

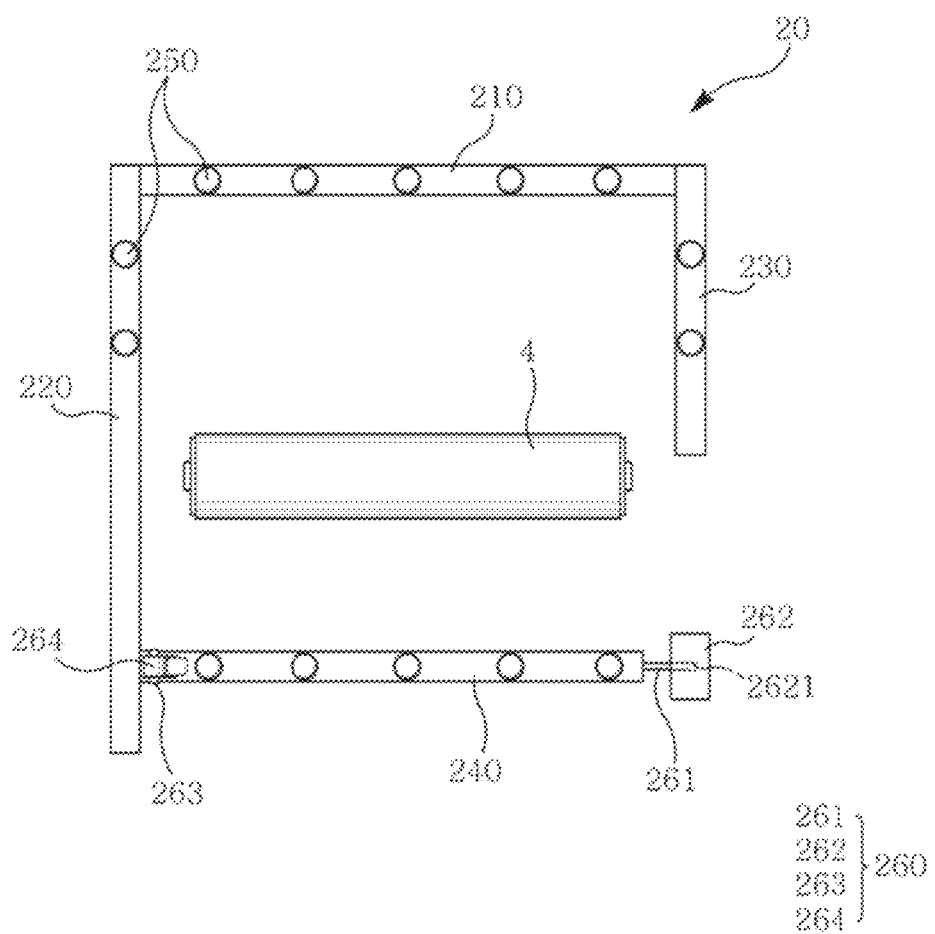
[Fig. 8]

[Fig. 9a]
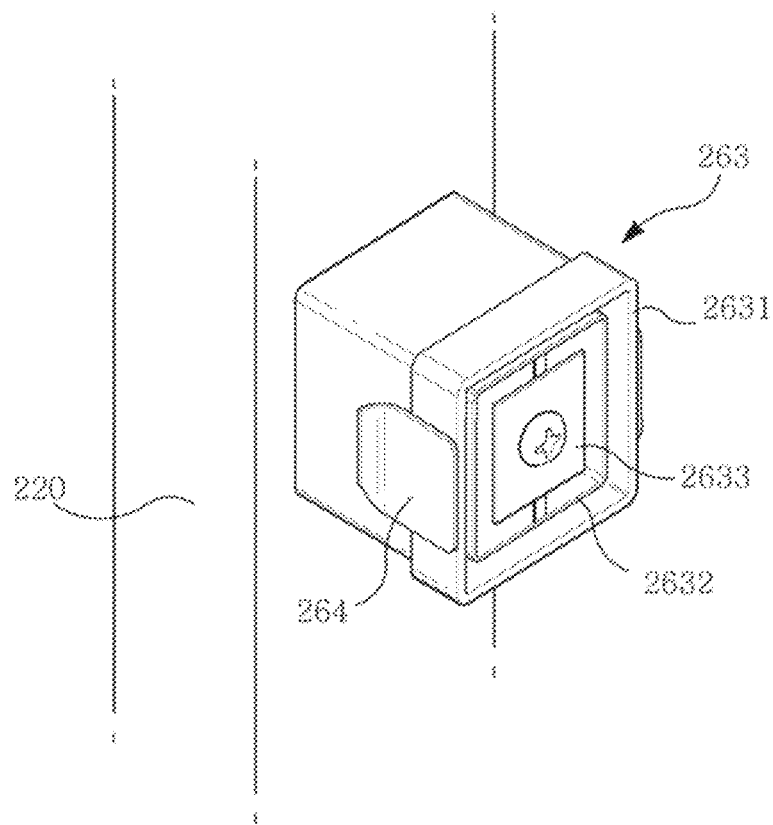
[Fig. 9b]
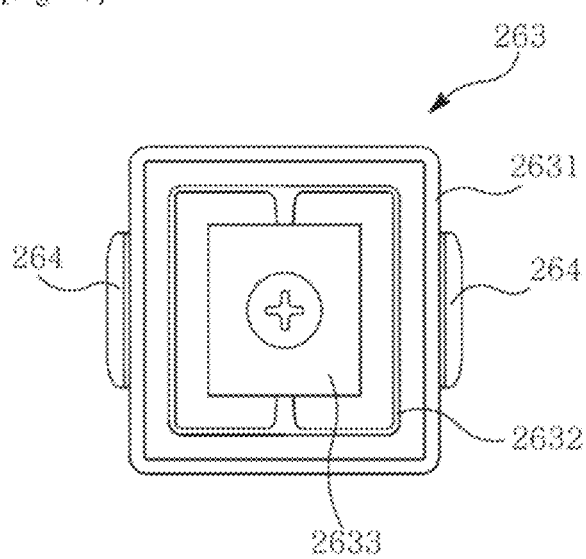

[Fig. 10]
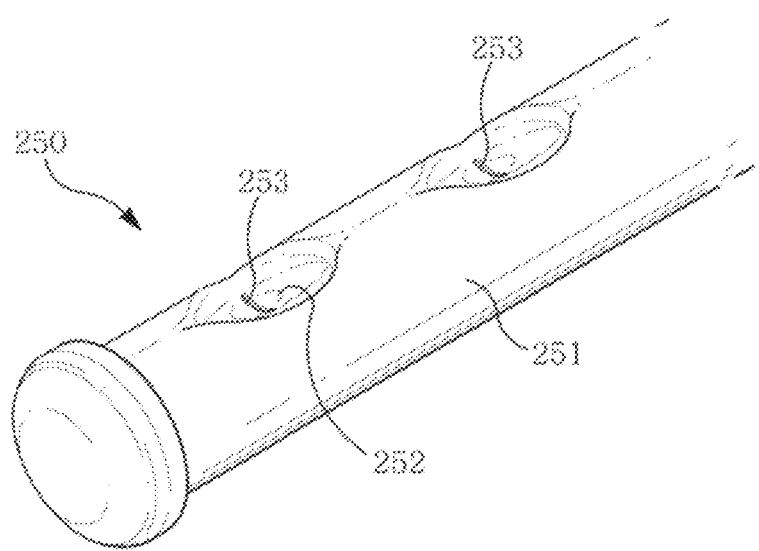

DISH WASHER

TECHNICAL FIELD

The present invention relates generally to a dishwasher. More particularly, the present invention relates to a dishwasher, wherein wash water and rinse water are preheated and hot air is supplied to a drying chamber through a single heat exchanger, thereby improving energy efficiency and improving filtration and supply performance of wash water.

BACKGROUND ART

In general, it is well known that a dishwasher used in large dining facilities such as hotels, hospitals, schools, factories, and army bases is designed to perform washing, rinsing, and drying in simple and hygienic manner while the dishes are transferred by a conveyor.

A dishwasher that automatically cleans a large amount of dishes is provided with a conveyor conveying the dishes, a washing chamber and a rinsing chamber in which wash water and rinse water are sprayed onto the conveyed dishes, and a drying chamber in which the washed dishes are dried. Here, wash water and rinse water are heated by hot water to improve efficiency of washing, and the drying chamber is provided with a drying device for supplying hot air to the drying chamber.

However, the aforementioned conventional dishwasher, which is composed of an electric type using a heating coil and a steam type using a boiler to provide hot water and hot air, has the following problems.

In the case of the electric type or the steam type, since a booster system and piping equipment are required, there is a problem in that equipment of the drying device is complicated, thereby increasing costs, and energy consumption is increased, thereby increasing fuel costs.

In addition, a heating device provided at the electric and steam types for supplying hot water and hot air cannot recycle exhaust heat, thereby causing an increase in energy consumption.

Meanwhile, the conventional dishwasher is provided with a wash water tank and a rinse water tank, whereby wash water stored in wash water tank is sprayed onto the dishes to be washed through a spray nozzle by using a water supply pump. At this time, wash water used for washing the dishes is collected in the wash water tank, the collected wash water is discharged to the outside of the wash water tank through an outlet of the wash water tank, and the discharged wash water is circulated by the water supply pump and sprayed again onto the dishes through the spray nozzle. Then, the dishes are rinsed by clean water stored in the rinse water tank.

As such, the conventional dishwasher adopts a structure in which wash water is reused. Since wash water used for washing the dishes is introduced to the wash water tank while containing food waste floating thereon, when wash water is reused for washing, contaminated water is circulated repeatedly to wash the dishes. Accordingly, it is unsanitary and the dishes are poorly washed. Thus, a porous filtering device is installed in the wash water tank to filter the food waste contained in wash water.

However, there resides a problem in that the food waste blocks the outlet of the filtering device, so wash water collected in the wash water tank cannot be efficiently discharged to the outside of the wash water tank.

DISCLOSURE

Technical Problem

Accordingly, the present invention has been made keeping in mind the above problems occurring in the related art, and the present invention is intended to propose a dishwasher, wherein wash water and rinse water are preheated and hot air is supplied to a drying chamber through a single heat exchanger, whereby energy can be saved, and circulation of wash water is improved by a filtering device applied to a structure in which wash water is reused, whereby sanitation and washing satisfaction of dishwashing can be improved.

Technical Solution

In order to achieve the above object, according to one aspect of the present invention, there is provided a dishwasher, wherein dishes placed on a conveyor are washed, rinsed, and dried while being sequentially conveyed to a washing chamber, a rinsing chamber, and a drying chamber, the dishwasher including: a heat exchanger allowing hot air to be supplied to the drying chamber by heat exchange; a wash water tank in which water supplied to the washing chamber or the rinsing chamber is stored; and a spray device spraying water supplied from the wash water tank onto the dishes placed on the conveyor.

The heat exchanger may include: a heating line configured to generate and discharge heat; a hot air line supplying air heated by heat exchange with the heating line to the drying chamber; and a preheating line supplying water heated by heat exchange with the heating line to the wash water tank.

Further, the wash water tank may be provided with a filtering device detachably provided therein, and the filtering device may include: a filter cylinder having a plurality of holes on an outer circumferential surface thereof; a mounting frame provided at a side of the filter cylinder, and mounted to a holder provided at the wash water tank; and a vortex-inducing wall surrounding the outer circumferential surface of the filter cylinder at a location spaced outward from the outer circumferential surface of the filter cylinder in a width direction of the filter cylinder.

In the preferred embodiment, when the filtering device is submerged in wash water, by the vortex-inducing wall, a vortex having a streamline of wash water may be formed in a direction parallel to the outer circumferential surface of the filter cylinder in a space defined between the filter cylinder and the vortex-inducing wall.

In the preferred embodiment, a first end of the vortex-inducing wall may be fixed to the mounting frame, and a second end of the vortex-inducing wall may extend to a position corresponding to a height of the outer circumferential surface of the filter cylinder, and a part of the second end of the vortex-inducing wall may be inwardly inclined with respect to the filter cylinder.

Moreover, the vortex-inducing wall may be spaced apart from the outer circumferential surface of the filter cylinder by a predetermined interval.

Here, the filter cylinder may have a cylindrical shape in which a first end thereof is open and a second end thereof is closed.

Meanwhile, the spray device may include one or more spray devices that are provided along the conveyor, with a first pipe placed at an upper side of the conveyor, second and third pipes placed at both sides of the conveyor, and a fourth pipe placed at a lower side of the conveyor, the first, second, and third pipes being connected to each other in an inverted U-shape to surround the conveyor, and the fourth pipe being connected to the second pipe, wherein each of the first, second, third, and fourth pipes may be provided with one or more spray nozzles.

Here, the fourth pipe may be detachably coupled to the second pipe through an attachment and detachment unit, and the attachment and detachment unit may include: a supporting rod extending from a second end of the fourth pipe; a fixing member provided at the dishwasher and into which the supporting rod is inserted; a receiving member protruding from the second pipe toward the fourth pipe and into which a first end of the fourth pipe is inserted; and an attachment and detachment member controlling to fix and release the fourth pipe in a state where the first end of the fourth pipe is inserted into the receiving member.

In the preferred embodiment, the receiving member protrudes from the second pipe toward the fourth pipe, and includes: a protruding frame protruding from the second pipe toward the fourth pipe, and having an inner circumferential surface corresponding to an outer circumferential surface of the fourth pipe; a supply opening spaced inwardly apart from the protruding frame and supplied with wash water from the wash water tank, wherein an outer circumferential surface of the supply opening corresponds to an inner circumferential surface of the fourth pipe; and a water pressure adjusting plate coupled to a central portion of the supply opening such that only an outer portion of the supply opening is exposed.

In the preferred embodiment, the spray nozzle may include: a plurality of nozzle bodies coupled to the first, second, third, and fourth pipes respectively to communicate with each other; at least one nozzle groove formed in a concave shape on a side surface of each of the nozzle bodies; and a nozzle hole formed at the nozzle groove and through which wash water is sprayed.

Advantageous Effects

According to the present invention having the above-described characteristics, it is possible to save energy by providing a single heat exchanger to preheat wash water and rinse water and supply hot air to a drying chamber, and to improve circulation of wash water by a filtering device applied to a structure for reusing wash water, whereby sanitation of dishwashing can be improved.

DESCRIPTION OF DRAWINGS

FIG. 1 is a view schematically showing a dishwasher according to the present invention.

FIG. 2 is a view schematically showing a heat exchanger of the present invention.

FIG. 3 is a conceptual view showing a state in which a filtering device of the present invention is installed in a wash water tank.

FIG. 4 is a cross-sectional view showing the filtering device of FIG. 3.

FIG. 5 is a perspective view showing a cross-section of a vortex-inducing wall of the filtering device of FIG. 3.

FIG. 6a is a conceptual view and a simulation of a finite element analysis showing a comparative example of a filtering device from which the vortex-inducing wall is removed.

FIG. 6b is a conceptual view and a simulation of a finite element analysis showing an embodiment of the filtering device having the vortex-inducing wall at an outer side of an outer circumferential surface of a filter cylinder.

FIG. 7a is a conceptual view showing a comparative example of the filtering device having a vortex-inducing wall set to a default height and a default width.

FIG. 7b is a conceptual view showing another embodiment of the filtering device having a vortex-inducing wall having an increased height than the embodiment of FIG. 7a.

FIG. 7c is a conceptual view showing a further embodiment of the filtering device having a vortex-inducing wall having an increased height and an increased width than the embodiment of FIG. 7a.

FIG. 8 is a schematic view showing an embodiment of a spray device of the present invention.

FIG. 9 is a view showing a receiving member provided at the spray device of FIG. 8.

FIG. 10 is a view showing an embodiment of a spray nozzle provided at the spray device of FIG. 8.

BEST MODE

All terms or words used in the specification and claims have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reference will now be made in greater detail to an exemplary embodiment of the present invention, an example of which is illustrated in the accompanying drawings. Wherever possible, the same reference numerals will be used throughout the drawings and the description to refer to the same or like parts.

As shown in FIG. 1, a dishwasher according to the present invention, wherein dishes placed on a conveyor 4 are washed, rinsed, and dried while being conveyed sequentially to a washing chamber 1, a rinsing chamber 2, and a drying chamber 3, includes a heat exchanger 30, a wash water tank 10, and a spray device 20.

The heat exchanger 30 is provided adjacent to the drying chamber 3, and may be provided at any side of the drying chamber 3. However, it may be provided at an upper side of the drying chamber 3 as shown in FIG. 1.

The heat exchanger 30 allows hot air to be supplied to the drying chamber 3 by heat exchange so that the dishes entering into the drying chamber 3 after being washed in the washing chamber 1 and being rinsed in the rinsing chamber 2, can be dried.

The wash water tank 10 stores wash water supplied to the washing chamber 1 therein, and is configured such that wash water stored in the wash water tank 10 is supplied to the spray device 20.

Moreover, the dishwasher according to the present invention may be provided with a rinse water tank 90 supplying rinse water to the rinsing chamber 2, whereby clean water can be supplied when the dishes are rinsed.

Next, the spray device 20 is configured to receive water from the wash water tank 10 or the rinse water tank 90 and to spray wash water (rinse water) onto the dishes on the conveyor 4 with appropriate water pressure when the dishes are washed or rinsed.

Hereinafter, the heat exchanger 30, which is a configuration of the present invention, will be described in more detail with reference to FIG. 2.

As shown in FIG. 2, the heat exchanger 30 according to the present embodiment includes a heating line 31, a hot air line 32, and a preheating line 33.

The heating line 31 is a line provided with a heating means (not shown) and through which heat heated by the heating means passes, and is configured to discharge heat to the outside after heat exchange.

Here, the heating means may be provided inside the heat exchanger 30, or may be provided adjacent to the heat exchanger 30.

The hot air line 32 is a line passing through the heat exchanger 30 and is provided with an air blowing means (not shown) such as a blower. The hot air line 32 is configured to allow air to flow toward an inside of the drying chamber 3 by using the air blowing means, and to perform heat exchange with the heating line 31.

In addition, the preheating 33 is also a line passing through the heat exchanger 30, and is configured such that water supplied from the wash water tank 10 or a water line is heat exchanged with the heating line 31, and thus the preheated water is supplied to the wash water tank 10 and the rinse water tank 90 of FIG. 1, or directly to the spray device 20.

As described above, by allowing water preheated by the preheating line 33 to be introduced to the wash water tank 10 or the rinse water tank 90, it is possible to raise a temperature of wash water to some extent, thereby improving efficiency of washing or rinsing. Although not shown in the drawing, it is obvious that there may be further provided a heating means directly or indirectly connected to the wash water tank 10 and heating wash water.

Meanwhile, a water circulation structure of the wash water tank 10 is as follows. Water stored in the wash water tank 10 is supplied to the spray device 20 by using a pump P, and is sprayed onto the dishes to be washed by the spray device 20. Then, water used for washing the dishes is collected again in the wash water tank 10 and the collected wash water is discharged through an outlet 11 of the wash water tank 10 to the outside of the wash water tank 10. The discharged wash water is circulated by the pump P and is sprayed again onto the dishes through the spray device 20, whereafter the dishes are rinsed by clean water stored in the rinse water tank 90.

As such, since wash water used for washing the dishes flows into the wash water tank 10 while containing food waste, if it is reused, wash water contaminated with the food waste is repeatedly circulated and thus efficiency of washing is lowered. Accordingly, the wash water tank 10 is provided with a filtering device detachably installed therein so as to improve efficiency of washing.

Hereinafter, the filtering device 100, which is a configuration of the present invention, will be described with reference to FIGS. 3 to 7.

FIG. 3 is a conceptual view showing a state in which the filtering device 100 according to an embodiment of the present invention is provided in the wash water tank 10. Referring to the drawing, the filtering device 100 according to the embodiment of the present invention is detachably provided on a lower side wall of the wash water tank 10, such that the filtering device 100 protrudes into the wash water tank 10. Here, an axial direction of a filter cylinder 110, which will be described later, may be the same as an inflow direction of wash water. For example, as shown in FIG. 3, the outlet 11 through which wash water is discharged is provided on an outer wall of the wash water tank 10. Accordingly, when wash water flows around the outlet 11, wash water flows in a direction substantially parallel to a bottom surface of the wash water tank 10.

Thus, the filtering device 100 may be installed such that the axial direction of the filter cylinder 110 is placed in the same direction as the bottom surface of the wash water tank 10.

Hereinafter, the filtering device 100 according to the embodiment of the present invention will be described in detail.

FIG. 4 is a cross-sectional view showing the filtering device 100 according to the embodiment of the present invention, and FIG. 5 is a perspective view showing a cross-section of a vortex-inducing wall 150 of the filtering device 100. As shown in the drawings, the filtering device 100 of the present invention includes the filter cylinder 110, a mounting frame 130, and the vortex-inducing wall 150.

First, the filter cylinder 110 has a porous structure in which a plurality of holes 101 is formed on a surface thereof.

There is no limitation on an external shape of the filter cylinder 110. However, in the present specification, the filter cylinder 110 will be described on the basis of the embodiment having a cylindrical shape as shown in FIG. 3.

Here, the filter cylinder 110 is open at a first end 111 thereof, wherein when the filtering device 100 is installed in the wash water tank 10, the first end 111 is provided to correspond to the outlet 11 provided on the external wall of the wash water tank 10. In other words, wash water discharged from the wash water tank 10 through the outlet 11 is filtered at a periphery of the outlet 11. Wash water enters the filter cylinder 110 through the holes 101 formed on the surface of the filter cylinder 110 and is then discharged to the outside of the wash water tank 10 through the outlet 11.

As shown in the drawings, a second end 112 of the filter cylinder 110 opposed to the open first end 111 may be closed, and the plurality of holes 101 is densely formed on an outer circumferential surface (a side surface) between the first and second ends of the filter cylinder 110.

Meanwhile, the filtering device 100 of the present invention is detachably mounted to a holder (not shown) provided at the wash water tank 10 by the mounting frame 130. The mounting frame 130 has a plate-like structure by extending from an edge of the open first end 111 of the filter cylinder 110 in a radial direction of the filter cylinder 110. The mounting frame 130 and the filter cylinder 110 may be provided as a single body made of the same material, or may be separately provided to be assembled with each other. In addition, the filtering device 100 of the present invention may be further provided with a handle part 170 so that a user can easily attach and detach the filtering device 100 to and from the holder.

The filter cylinder 110 is configured to filter the food waste floating on wash water introduced into the wash water tank 10. The filter cylinder 110 allows the food waste floating on wash water to be filtered and left in the wash water tank 10, and then wash water passed through the filter cylinder 110 is discharged to the outside of the wash water tank 10 through the outlet 11. For reference, the wash water tank 10 is provided with a porous filter plate at an inlet thereof, so that it is possible to firstly filter the food waste floating on wash water used for washing the dishes and then to supply the filtered wash water to the wash water tank 10.

Accordingly, the food waste is filtered firstly by the filter plate and thus the filtered food waste passed through the filter plate is filtered secondarily by the filtering device 100 of the present invention. However, there is a need to solve a problem that the food waste is caught in and blocks the holes 101 formed on the filter cylinder 110 of the filtering device 100. In an effort to this problem, the filtering device 100 of the present invention is provided with the vortex-inducing wall 150 surrounding a circumference of the side surface of the filter cylinder 110.

As shown in FIG. 4, the vortex-inducing wall 150 may be provided to protrude from a surface of the mounting frame 130, such that the vortex-inducing wall 150 surrounds the circumference of the side surface of the filter cylinder 110 at a location spaced outward apart from the side surface of the filter cylinder 110, and by the vortex-inducing wall 150, a predetermined space (hereinafter, referred to as a vortex-forming space) is formed between the filter cylinder 110 and the vortex-inducing wall 150.

When the filtering device 100 of the present invention is submerged in wash water in the wash water tank 10, in the vortex-forming space, a vortex having a streamline of wash water is formed in a direction parallel to the side surface of the filter cylinder 110.

Further, by this vortex flowing in the direction parallel to the side surface of the filter cylinder 110, the food waste caught in the holes 101 is cut and separated from the filter cylinder 110. A distribution of the streamline can be confirmed by a finite element analysis. FIG. 6a is a conceptual view and a simulation of a finite element analysis showing a comparative example of a filtering device 100 from which the vortex-inducing wall 150 is removed, and FIG. 6b is a conceptual view and a simulation of a finite element analysis showing an embodiment of the filtering device 100 having the vortex-inducing wall 150 at an outer side of the outer circumferential surface of the filter cylinder 110. First, in the comparative example of FIG. 6a, it can be confirmed that a streamline of wash water is formed in a direction perpendicular to the side surface of the filter cylinder 110 at the outer side of the filter cylinder 110.

This vertical streamline causes a situation in which the food waste caught in the holes 101 of the filter cylinder 110 is more strongly deposited. On the other hand, in the embodiment of FIG. 6b, wash water has a horizontal stream line in a direction parallel to the filter cylinder 110 at a periphery of the side surface of the filter cylinder 110. By this vortex having the horizontal streamline, the food waste caught in the holes 101 of the filter cylinder 110 can be cut or separated from the filter cylinder 110.

Meanwhile, as described above, a first end of the vortex-inducing wall 150 may be fixed to the surface of the mounting frame 130, and a second end of the vortex-inducing wall 150 may extend to a position corresponding to a height of the side surface of the filter cylinder 110. As such, by providing the vortex-inducing wall 150 to correspond to the height of the filter cylinder 110, it is possible to form the vortex in the direction parallel to the side surface of the filter cylinder 110 with respect to an entire side surface of the filter cylinder 110. However, a height of the second end of the vortex-inducing wall 150 may not exceed the height of the filter cylinder 110.

Moreover, the vortex-inducing wall 150 may be spaced apart from the side surface of the filter cylinder 110 by a predetermined interval, and the vortex-forming space defined between the vortex-inducing wall 150 and the filter cylinder 110 may have a constant width with respect to the side surface of the filter cylinder 110, whereby it is possible to form a constant vortex with respect to the circumference of the side surface of the filter cylinder 110. Here, when the width of the vortex-forming space is increased, and a height of the vortex-inducing wall 150 is increased within a range in which the height of the vortex-inducing wall 150 does not exceed the height of the filter cylinder 110, a flow velocity of a vortex in the vortex-forming space is increased.

With reference to FIGS. 7a to 7c, FIG. 7b is a conceptual view showing a filtering device 100 according to another embodiment of the present invention in which a height of the vortex-inducing wall 150 of FIG. 7a is increased, and FIG. 7c is a conceptual view showing a filtering device 100 according to a further embodiment of the present invention in which the height and a width of the vortex-inducing wall 150 of FIG. 7a are increased.

Referring to Table 1 below, it is found that an average flow velocity is increased in the embodiment of FIG. 7b in which the height of the vortex-inducing wall 150 is increased, and the average flow velocity is further increased in the embodiment of FIG. 7c in which the height and the width of the vortex-inducing wall 150 are increased.

TABLE 1

| FIG. | Average Flow Velocity(m/s) in tangential direction in drawings |
|---|---|
| FIG. 7a | 0.29 |
| FIG. 7b | 0.70 |
| FIG. 7c | 0.72 |

Meanwhile, as shown in FIG. 4, the vortex-inducing wall 150 may include a horizontal portion 151 parallel to the side surface of the filter cylinder 110 and an inclined portion 153 leaning from the second end of the vortex-inducing wall 150 toward the filter cylinder 110. In other words, a part of the second end of the vortex-inducing wall 150 may lean inward with respect to the filter cylinder 110 placed inside the vortex-inducing wall 150 so as to form the inclined portion 153. According to this structure, an inlet of the vortex-forming space defined between the second end of the filter cylinder 110 and the second end of the vortex-inducing wall 150 becomes narrow, whereby the vortex having the horizontal stream line can be induced from the inlet of the vortex-forming space.

According to the filtering device 100 according to the embodiment of the present invention, by providing the vortex-inducing wall 150 at the periphery of the outer circumferential surface of the filter cylinder 110 to thereby form the vortex having the streamline in the direction parallel to the outer circumferential surface of the filter cylinder 110 at the periphery of the outer circumferential surface of the filter cylinder 110, the food waste caught in the holes 101 of the filter cylinder 110 can be separated. Thus, it is possible to easily remove the food waste remaining in the filtering device 100 by using a flow of wash water.

Accordingly, circulation of wash water through the holes 101 of the filtering device 100 can be improved, thereby improving sanitation and satisfaction of dishwashing.

Hereinafter, the spraying device 20, which is a configuration of the present invention, will be described in more detail with reference to FIGS. 8 to 10.

As shown in FIG. 8, the spraying device 20 according to the present invention includes one or more spraying devices 20 that are provided at the washing chamber 1 and the rinsing chamber 2 along the conveyor 4. The conveyor 4 is surrounded by the spraying device 20 so that wash water or rinse water is sprayed onto the dishes on the conveyor 4 in multiple directions to improve efficiency washing and rinsing.

The spray device 20 is configured with a first pipe 210 provided at an upper side of the conveyor 4, second and third pipes 220 and 230 provided at both sides of the conveyor 4, and a fourth pipe 240 provided at a lower side of the conveyor 4. The first, second, third pipes 210, 220, and 230 are connected in an inverted U-shape, and the fourth pipe 240 is connected to the second pipe 220.

At this time, water supplied from the wash water tank 10 or the rinse water tank 90 is introduced into the second pipe 220, then water introduced into the second pipe 220 is divided into two portions, one of which goes to the first and second pipes 210 and 230 while the other goes to the fourth pipe 240.

In addition, each of the first, second, third, and fourth pipes 210, 220, 230, and 240 is provided with one or more spray nozzles 250, such that wash and rinse water sprayed form the spray nozzles 250 are directed toward the dishes on the conveyor 4.

Meanwhile, the fourth pipe 240 is placed at the lower side of the conveyor 4 and may be detachably coupled to the second pipe 220 through an attachment and detachment unit 260. In a structural aspect, when the dishes are washed, the food waste remaining on the dishes is separated from the dishes and then flows into the fourth pipe 240 placed at the lower side of the conveyor 4. Accordingly, the fourth pipe 240 is more likely than other pipes to be contaminated. Thus, by providing the fourth pipe 240 to be detachable, the fourth pipe 240 can be easily and periodically cleaned.

The attachment and detachment unit 260 includes a supporting rod 261, a fixing member 262, a receiving member 263, and an attachment and detachment member 264.

As shown in FIG. 8, the supporting rod 261 extends from a second end of the fourth pipe 240, that is, a right end of the fourth pipe in the drawing.

In addition, the fixing member 262 provided at the dishwasher is provided with a fixing groove into which the supporting rod 261 is inserted to be engaged therewith, such that the supporting rod 261 is supported by the fixing member 262.

Here, although not mentioned above, normally the dishwasher has a frame structure, so the fixing member 262 may be coupled to the frame structure.

Next, the receiving member 263 protrudes from the second pipe 220 toward the fourth pipe 240, such that a first end (a left end of the second pipe in FIG. 8) of the fourth pipe 240 is inserted into the receiving member 263.

Here, as shown in FIGS. 9*a* and 9*b*, the receiving member 263 includes a protruding frame 2631, a supply opening 2632, and a water pressure adjusting plate 2633.

First, the protruding frame 2631 protrudes from the second pipe 220 toward the fourth pipe 240, and has an inner circumferential surface corresponding to an outer circumferential surface of the fourth pipe 240. The outer circumferential surface of the fourth pipe 240 is fitted to the inner circumferential surface of the protruding frame 2631 in such a manner as to be in close contact therewith.

Further, the supply opening 2632 having a tubular structure is spaced inwardly apart from the protruding frame 2631, such that wash water or rinse water from the wash water tank 10 or the rinse water tank 90 is supplied through the supply opening 2632.

The supply opening 2632 is configured such that an outer circumferential surface thereof corresponds to an inner circumferential surface of the fourth pipe 240. The inner circumferential surface of the fourth pipe 240 is fitted to the outer circumferential surface of the supply opening 2632 in such a manner as to be in close contact therewith.

Here, a packing member (not shown) may be provided on the inner circumferential surface of the protruding frame 2631 and the outer circumferential surface of the supply opening 2632, so that the supply opening 2632 and the fourth pipe 240 can have watertightness therebetween when coupled to each other.

In particular, as shown in FIG. 9*b*, the water pressure adjusting plate 2633 is coupled to a central portion of the supply opening 2632. By providing the water pressure adjusting plate 2633, the central portion of the supply opening 2632 is blocked while an outer portion of the supply opening 2632 communicates with the fourth pipe 240.

Wash water (rinse water) entering the second pipe 220 is divided into the fourth pipe 240 at an inlet of the second pipe 220, and thus pressure of water supplied to the first and third pipes 210 and 230 is reduced. As such, in the embodiment of the present invention, water flows into the fourth pipe 240 prior to reaching the first, second, and third pipes 210, 220, and 230. Accordingly, by providing the water pressure adjusting plate 2633 and thereby reducing a passage of an inlet of the fourth pipe 240, water pressure of the first, second, and third pipes 210, 220, and 230 can be prevented from being reduced. Thus, it is possible to supply water to the first to fourth pipes 210 to 240 at the same pressure, thereby improving efficiency of washing and rinsing.

Next, the attachment and detachment member 264 controls to fix and release the fourth pipe 240 in a state where the first end of the fourth pipe 240 is inserted into the receiving member 263. Various conventional coupling structures having the above object can be applied, and a detailed description thereof will be omitted.

Meanwhile, as shown in FIG. 10, the spray nozzle 250 includes a nozzle body 251, a nozzle groove 252, and a nozzle hole 253.

A plurality of nozzle bodies 251 is coupled to the first, second, third, and fourth pipes 210, 220, 230, and 240 respectively to communicate with each other.

Here, the nozzle body 251 may be formed in various shapes, but may have a cylindrical shape as shown in the drawing.

In addition, at least one nozzle groove 252 is formed in a concave shape on a side surface of each of the nozzle bodies 251, and the nozzle hole 253 is formed in an I-shape at the most concave portion of the nozzle groove 252.

Due to the above-described configuration, water (wash water and rinse water) can be sprayed onto a wide area through the nozzle hole 253, and pressure of water flowing into an inside of the cylindrical nozzle body 251 is increased at the nozzle hole 253 formed by the concaved nozzle groove 252, whereby pressure of water sprayed through the nozzle hole 253 can be increased. Thus, it is expected that efficiency of washing or rinsing can be improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A dishwasher, wherein dishes placed on a conveyor are washed, rinsed, and dried while being sequentially conveyed to a washing chamber, a rinsing chamber, and a drying chamber, the dishwasher comprising:
   a heat exchanger allowing hot air to be supplied to the drying chamber by heat exchange;
   a wash water tank in which water supplied to the washing chamber or the rinsing chamber is stored; and
   a spray device spraying water supplied from the wash water tank onto the dishes placed on the conveyor, wherein the heat exchanger includes:
a heating line configured to generate and discharge heat;
a hot air line supplying air heated by heat exchange with the heating line to the drying chamber; and
a preheating line supplying water heated by heat exchange with the heating line to the wash water tank.

2. The dishwasher of claim 1, wherein the wash water tank is provided with a filtering device, the filtering device including:
a filter cylinder having a plurality of holes on an outer circumferential surface thereof;
a mounting frame provided at a side of the filter cylinder, and mounted to a holder provided at the wash water tank; and
a vortex-inducing wall surrounding the outer circumferential surface of the filter cylinder at a location spaced outward from the outer circumferential surface of the filter cylinder in a width direction of the filter cylinder.

3. The dishwasher of claim 2, wherein when the filtering device is submerged in wash water, by the vortex-inducing wall, a vortex having a streamline of wash water is formed in a direction parallel to the outer circumferential surface of the filter cylinder in a space defined between the filter cylinder and the vortex-inducing wall.

4. The dishwasher of claim 2, wherein a first end of the vortex-inducing wall is fixed to the mounting frame, and a second end of the vortex-inducing wall extends to a position corresponding to a height of the outer circumferential surface of the filter cylinder, and a part of the second end of the vortex inducing-wall is inwardly inclined with respect to the filter cylinder.

5. The dishwasher of claim 2, wherein the vortex-inducing wall is spaced apart from the outer circumferential surface of the filter cylinder by a predetermined interval.

6. The dishwasher of claim 2, wherein the filter cylinder has a cylindrical shape in which a first end thereof is open and a second end thereof is closed.

7. The dishwasher of claim 1, wherein the spray device comprises one or more spray devices that are provided along the conveyor, with a first pipe placed at an upper side of the conveyor, second and third pipes placed at both sides of the conveyor, and a fourth pipe placed at a lower side of the conveyor, the first, second, and third pipes being connected to each other in an inverted U-shape to surround the conveyor, and the fourth pipe being connected to the second pipe, wherein
each of the first, second, third, and fourth pipes is provided with one or more spray nozzles.

8. The dishwasher of claim 7, wherein the fourth pipe is detachably coupled to the second pipe through an attachment and detachment unit, the attachment and detachment unit including:
a supporting rod extending from a second end of the fourth pipe;
a fixing member provided at the dishwasher and into which the supporting rod is inserted;
a receiving member protruding from the second pipe toward the fourth pipe and into which a first end of the fourth pipe is inserted; and
an attachment and detachment member controlling to fix and release the fourth pipe in a state where the first end of the fourth pipe is inserted into the receiving member.

9. The dishwasher of claim 8, wherein the receiving member includes:
a protruding frame protruding from the second pipe toward the fourth pipe, and having an inner circumferential surface corresponding to an outer circumferential surface of the fourth pipe;
a supply opening spaced inwardly apart from the protruding frame and supplied with wash water from the wash water tank, wherein an outer circumferential surface of the supply opening corresponds to an inner circumferential surface of the fourth pipe; and
a water pressure adjusting plate coupled to a central portion of the supply opening such that an outer portion of the supply opening is exposed.

10. The dishwasher of claim 7, wherein the spray nozzle includes:
a plurality of nozzle bodies coupled to the first, second, third, and fourth pipes respectively to communicate with each other;
at least one nozzle groove formed in a concave shape on a side surface of each of the nozzle bodies; and
a nozzle hole formed at the nozzle groove and through which wash water is sprayed.

* * * * *